Patented Feb. 20, 1934

1,948,201

UNITED STATES PATENT OFFICE 1,948,201

METHOD OF MAKING SODIUM ETHYL OXALACETATE AND THE PRODUCT THEREOF

Ray M. Carter and William L. Johnson, Baltimore, Md., assignors to U. S. Industrial Alcohol Co., New York, N. Y., a corporation of West Virginia No Drawing. Application July 26, 1932
Serial No. 624,904

13 Claims. (Cl. 260—106)

The object of this invention is to provide a simple method of manufacturing sodium ethyl oxalacetate ($C_2H_5OOC$—$C(ONa)$=$CH$—$COOC_2H_5$), whereby a high yield is obtained and a stable, solid material is produced.

A further object is to provide a new article of commerce, which is not only stable but is of a composition and consistency that make it especially advantageous for use in industry. This material is useful in chemical synthesis, especially for the purpose of the so-called pyrazolone derivatives used as intermediates in the preparation of dyes and medicinal products.

The solid, stable sodium salt has never before been made on a commercial scale. The free ester, ethyl oxalacetate, would not be available as an article of manufacture, because of its instability.

Wislicenus (Ann. 246, 312 (1888)) referred to three laboratory methods for forming the sodium salt. The third of these would seem to have involved in part, the same reactions as those we employ, and Wislicenus said of it that it was simpler than the other two but that the yield was lower. He gave a yield of 70–80% for the first two methods, as against only 45–50% by the third method. Contrary to this, commercial scale operations in accordance with our invention afford yields of 75–80% on the sodium, ethyl acetate, and diethyl oxalate. Wislicenus' first two methods we have found not adapted for manufacturing purposes.

We have found that the yield of sodium ethyl oxalacetate may be increased and the quality of the product materially improved if the liquid reaction product be heated, preferably to boiling, for a short time after the reaction has been seemingly completed at a lowered temperature.

In order to obtain a stable, solid sodium ethyl oxalacetate, Wislicenus either recrystallized the crude salt from boiling absolute alcohol or washed the crude salt with ether. Both of these methods are troublesome and tend to cause considerable loss of product when carried out commercially. We have found that these purification methods may be eliminated and that a stable, solid salt may be produced if one subjects the pasty reaction product to filtration under high pressure,—about 2000 lbs. to the square inch,—by means of a press.

The lower pressures reached in an ordinary filter press are insufficient for the removal of such an amount of alcohol and unreacted constituents from the reaction product as would result in a stable, solid, sodium salt. If one uses ordinary pressure filtration only, then a washing of the filtered product with ether or alcohol or a similar wash liquid is necessary for the preparation of a stable, solid, sodium salt.

The conclusion is reached that instability results from the presence of a small but detrimental amount of unreacted constituents, or perhaps of intermediate or side reaction products, and especially to the presence of sodium ethylate in the solid material after it has been separated from the liquid. For this reason, drying of the material, after separating it from the liquid as far as is possible to do so by the usual method of filter pressing, gives an unstable product, since the drying drives off practically only alcohol, leaving residual sodium ethylate and other impurities in the solid mass.

While the salt may be dried hard, if desired, after the more thorough separation from the liquid which we effect, we find that that is not necessary for the uses to which the material is to be put, and that the product may contain about 10%–15% residual alcohol (together with the very slight amount of impurities in that amount of the alcoholic medium), without impairment. A product of this consistency, which is essentially solid but not hard, is more convenient for subsequent uses than a hard material, since it is easily put into the form of a slurry. It is important, however, so to conduct the prior operations that there be very little or no unreacted sodium ethylate left at the completion of the reactions. For that reason, while it is essential to use all the ingredients, except the alcohol in amounts very close to the stoichiometrical proportions, nevertheless it is advisable in using commercial materials to depart from these proportions to the extent of about 2%–3% excess of ethyl acetate and ethyl oxalate, which can be done without causing the reactions to proceed in undesired directions. Any variation in the contrary sense should be avoided.

The manufacturing procedure is as follows:

23 parts of metallic sodium are dissolved in about 391 parts of absolute alcohol. The amount of alcohol may be greater but should not be materially less than 391 parts. The solution is cooled, preferably to a temperature of 0°–15° C. Then a mixture of 150 parts diethyl oxalate and 91 parts of ethyl acetate are added. While it is not necessary to add these two ingredients simultaneously as a mixture, it is important not to add the ethyl acetate first and let it stand for any appreciable time with the sodium ethylate, since if that were done there would be a formation of aceto-acetic ester, which is not desired and would reduce the yield of the desired salt. The reaction is then allowed to proceed at a temperature of 0° C.–15° C. for a period of 2–4 hours. The reaction mixture is then brought to a gentle boil and kept at such a temperature for a period of 15–30 minutes. The reaction mixture is then allowed to cool, whereupon it sets to a pasty mass, substantially without free liquid. This material is then placed in appropriate containers such as in canvas bags, and the liquid is expressed by high pressure,—about 2000 lbs. to the square inch,—by means of a press.

The result is a cake of sodium ethyl oxalacetate, usually containing about 90% solids (the remainder being essentially residual alcohol, the presence of which is desirable), essentially free from unreacted constituents, and stable in shipment and storage for any reasonable period of time. The dry solids in the cake are of approximately 96–99% purity. In the friable form which results from this method of separation, the percentage of solids may be increased by drying if desired. The cake is easily broken up for convenience in packing in containers and in use.

It is believed that unreacted constituents (other than alcohol) in the product do not exceed a maximum of 1%, though that is not necessarily a precise limitation, and precaution is taken, as stated, to prevent, as far as possible, the presence of free sodium ethylate in this slight percentage. The alcohol and the rest of the possible impurities, consisting, probably, of sodium salts of substances formed as side reaction products, do not affect the commercial stability or industrial usefulness of the material.

This application is a continuation-in-part of our application Serial No. 549,570, filed July 8, 1931.

We claim:

1. The method of manufacturing stable sodium ethyl oxalacetate, which comprises dissolving sodium in absolute ethyl alcohol, cooling the solution to about 0°–15° C., adding diethyl oxalate and ethyl acetate in substantially stoichiometrical proportions, allowing the reaction to proceed substantially to completion at the lowered temperature, warming the liquid reaction mixture for a period of about 15–30 minutes, cooling to a pasty mass, and obtaining a substantially solid product by expressing liquid from the mass under high pressure.

2. The method of manufacturing stable sodium ethyl oxalacetate, which comprises dissolving sodium in absolute ethyl alcohol, cooling the solution to about 0°–15° C., adding diethyl oxalate and ethyl acetate in substantially stoichiometrical proportions, allowing the reaction to proceed substantially to completion at the lowered temperature, warming the liquid reaction mixture to the boiling point, for a period of about 15–30 minutes, cooling to a pasty mass, and obtaining a substantially solid product by expressing liquid from the mass under high pressure.

3. The method of manufacturing stable sodium ethyl oxalacetate, which comprises dissolving sodium in absolute ethyl alcohol, cooling the solution to about 0°–15° C., adding diethyl oxalate and ethyl acetate both in excess of stoichiometrical amounts by about 2–3 per cent., allowing the reaction to proceed substantially to completion at the lowered temperature, warming the liquid reaction mixture for a period of about 15–30 minutes, cooling to a pasty mass, and obtaining a substantially solid product by expressing liquid from the mass under high pressure.

4. The method of manufacturing stable sodium ethyl oxalacetate, which comprises dissolving sodium in absolute ethyl alcohol, cooling the solution to about 0°–15° C., adding diethyl oxalate and ethyl acetate both in excess of stoichiometrical amounts by about 2–3 per cent., allowing the reaction to proceed substantially to completion at the lowered temperature, warming the liquid reaction mixture to the boiling point, for a period of about 15–30 minutes, cooling to a pasty mass, and obtaining a substantially solid product by expressing liquid from the mass under high pressure.

5. The method of manufacturing stable sodium ethyl oxalacetate, which comprises dissolving sodium in absolute ethyl alcohol in the proportions of 23 parts of sodium to approximately 391 parts of absolute alcohol, cooling the solution to about 0°–15° C., adding diethyl oxalate and ethyl acetate in substantially stoichiometrical proportions, allowing the reaction to proceed substantially to completion at the lowered temperature, warming the liquid reaction mixture to the boiling point, for a period of about 15–30 minutes, cooling to a pasty mass, and obtaining a substantially solid product by expressing liquid from the mass under high pressure.

6. The method of manufacturing stable sodium ethyl oxalacetate, which comprises dissolving sodium in absolute ethyl alcohol in the proportions of 23 parts of sodium to approximately 391 parts of absolute alcohol, cooling the solution to about 0°–15° C., adding diethyl oxalate and ethyl acetate both in excess of stoichiometrical amounts by about 2–3 per cent., allowing the reaction to proceed substantially to completion at the lowered temperature, warming the liquid reaction mixture to the boiling point, for a period of about 15–30 minutes, cooling to a pasty mass, and obtaining a substantially solid product by expressing liquid from the mass under high pressure.

7. The method of manufacturing stable sodium ethyl oxalacetate, which comprises dissolving sodium in absolute ethyl alcohol, cooling the solution to about 0°–15° C., adding diethyl oxalate and ethyl acetate in substantially stoichiometrical proportions, allowing the reaction to proceed substantially to completion at the lowered temperature, and then warming the reaction mixture for a period of about 15–30 minutes.

8. The method of manufacturing stable sodium oxalacetate, which comprises dissolving sodium in absolute ethyl alcohol, cooling the solution to about 0°–15° C., adding diethyl oxalate and ethyl acetate in substantially stoichiometrical proportions, allowing the reaction to proceed substantially to completion at the lowered temperature, and then warming the liquid reaction mixture to the boiling point, for a period of about 15–30 minutes.

9. The method of manufacturing stable sodium ethyl oxalacetate, which comprises dissolving sodium in absolute ethyl alcohol, cooling the solution to about 0°–15° C., adding diethyl oxalate and ethyl acetate both in excess of stoichiometrical amounts by about 2–3 per cent., allowing the reaction to proceed substantially to completion at the lowered temperature, and then warming the reaction mixture for a period of about 15–30 minutes.

10. The method of manufacturing stable sodium ethyl oxalacetate, which comprises dissolving sodium in absolute ethyl alcohol, cooling the solution to about 0°–15° C., adding diethyl oxalate and ethyl acetate both in excess of stoichiometrical amounts by about 2–3 per cent., allowing the reatction to proceed substantially to completion at the lowered temperature, and then warming the liquid reaction mixture to the boiling point, for a period of about 15–30 minutes.

11. The method of manufacturing sodium ethyl oxalacetate, which comprises dissolving sodium in absolute alcohol, reacting the resulting sodium ethylate with diethyl oxalate and ethyl acetate both added in excess of the stoichiometrical amounts by about 2–3 per cent., and removing liquid from the pasty reaction product by the use of high pressure, whereby a stable, substantially solid material is obtained.

12. The method of manufacturing sodium ethyl oxalacetate, which comprises dissolving sodium in absolute alcohol, reacting the resulting sodium ethylate with diethyl oxalate and ethyl acetate both added in excess of the stoichiometrical amounts by about 2–3 per cent., and expressing liquid from the pasty reaction product under a pressure of about 2000 lbs. per square inch.

13. The herein described product, stable sodium ethyl oxalacetate, the same being a friable solid material, containing residual alcohol in substantial amount, but otherwise essentially free of other unreacted constituents, more especially unreacted sodium ethylate.

RAY M. CARTER.
WILLIAM L. JOHNSON.